US012265272B2

(12) United States Patent
Leeson et al.

(10) Patent No.: US 12,265,272 B2
(45) Date of Patent: *Apr. 1, 2025

(54) FIBER CONNECTION BOX FOR MULTI-DWELLING UNIT

(71) Applicant: PPC BROADBAND FIBER LTD., Woodbridge (GB)

(72) Inventors: Kim Leeson, Ipswich (GB); Shaun Trezise, Aldeburgh (GB)

(73) Assignee: PPC BROADBAND FIBER LTD., Woodbridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/578,063

(22) Filed: Jan. 18, 2022

(65) Prior Publication Data

US 2022/0252808 A1 Aug. 11, 2022

Related U.S. Application Data

(63) Continuation of application No. 16/209,964, filed on Dec. 4, 2018, now Pat. No. 11,226,462.

(Continued)

(51) Int. Cl.
G02B 6/44 (2006.01)

(52) U.S. Cl.
CPC ........... *G02B 6/445* (2013.01); *G02B 6/4447* (2013.01); *G02B 6/4448* (2013.01); *G02B 6/4454* (2013.01)

(58) Field of Classification Search
CPC .... G02B 6/445; G02B 6/4446; G02B 6/4448; G02B 6/4454; G02B 6/4475
See application file for complete search history.

(56) References Cited

U.S. PATENT DOCUMENTS 5,222,184 A 6/1993 Foss
7,751,675 B2 7/2010 Holmberg et al.
(Continued)

FOREIGN PATENT DOCUMENTS

CN 203930167 U 11/2014
EP 2290418 A1 3/2011
JP 2001-51130 A 2/2001

OTHER PUBLICATIONS

International Search Report and Written Opinion dated Jun. 6, 2019 in corresponding International Application No. PCT/IB2018/001614, 11 pages.

(Continued)

*Primary Examiner* — Michael P Mooney
(74) *Attorney, Agent, or Firm* — MH2 TECHNOLOGY LAW GROUP LLP

(57) ABSTRACT

An optical connection box for housing an optical connection between a distribution cable and at least one drop cable of an optical access network includes a base. The base includes a bottom configured to house an excess length of a first optical fiber of a distribution cable in a first section of the interior and configured to house an excess length of a second optical fiber of a drop cable in a second section of the interior, a first sidewall having a slot and recessed configured to receive a duct housing the distribution cable, and a plurality of splice-holder elements extending from the bottom of the base and configured to house at least one splice between the first optical fiber of the distribution cable and either (i) the second optical fiber of the drop cable, or (ii) an optical fiber pigtail that is coupled with the second optical fiber of the drop cable. The first section and the second section are disposed on opposite sides of the splice-holder elements.

26 Claims, 6 Drawing Sheets

Related U.S. Application Data

(60) Provisional application No. 62/594,540, filed on Dec. 4, 2017.

(56) References Cited

U.S. PATENT DOCUMENTS

| | | |
|---|---|---|
| 10,374,746 B1 | 8/2019 | Lawrence |
| 11,226,462 B2 * | 1/2022 | Leeson ............... G02B 6/4454 |
| 2003/0123935 A1 | 7/2003 | Dofher |
| 2003/0231849 A1 | 12/2003 | Rodriguez et al. |
| 2006/0215980 A1 | 9/2006 | Bayazit et al. |
| 2008/0181570 A1 | 7/2008 | Mullaney |
| 2009/0202214 A1 | 8/2009 | Holmberg et al. |
| 2012/0295486 A1 * | 11/2012 | Petersen ............. G02B 6/4448 |
| | | 439/658 |
| 2013/0209051 A1 | 8/2013 | Wu et al. |

OTHER PUBLICATIONS

Taiwanese First Office Action dated Jul. 21, 2022 in corresponding Taiwanese Application No. 107143513, 4 pages.
Taiwanese Second Office Action dated Dec. 21, 2022 in corresponding Taiwanese Application No. 107143513, 13 pages.
European Office Action dated Feb. 12, 2024 in corresponding European Application No. 18859980.7, 10 pages.

* cited by examiner

FIBER CONNECTION BOX FOR MULTI-DWELLING UNIT

CROSS-REFERENCE TO RELATED APPLICATIONS

This application is a continuation of U.S. application Ser. No. 16/209,964, filed on Dec. 4, 2018, pending, which claims the benefit of U.S. Provisional Application No. 62/594,540 filed Dec. 4, 2017, the disclosures of which are hereby incorporated by reference in their entireties.

BACKGROUND

The present disclosure relates to the field of apparatuses for the installation of optical access networks. In particular, the present disclosure relates to an optical fiber connection box for housing an optical connection between a duct housing a bundle of fiber optic cables and at least one drop cable of an optical access network.

As demand for data and connectivity increases, network planners and installers are seeking more efficient and cost-effective deployment options for their fiber to the X (FTTX) rollouts. FTTX comprises the many variants of fiber optic access infrastructure. These include fiber to the home (FTTH), fiber to the premise (FTTP), fiber to the building (FTTB), fiber to the node (FTTN), and fiber to the curb or cabinet (FTTC). The optical FTTP or FTTH network is an optical access network that supplies broadband or ultra-broadband communication services to a number of end users (e.g., services that require data transmission speeds measuring several hundred Mbit/s or even higher).

An optical FTTP or FTTH network typically includes a distribution box, which is typically located in the basement or vault of a multi-dwelling unit building in which the end users reside. An optical-fiber distribution cable typically leads out of the distribution box and runs in the interior of the building from the basement or vault to each floor. Between two successive floors, the distribution cable is typically laid in a duct, which mechanically protects the cable. This duct can be fixed to the surface of a wall or can be housed within the wall itself (e.g., in concrete). At each floor of the building, the optical cables typically pass through connection boxes or cases so as to be connected to the equipment in the apartments or offices of the end users.

The distribution cable can be connected optically to one or more drop cables. As used herein, a "drop cable" is an optical fiber cable that typically runs towards an apartment or office of an end user within a special duct fixed to the surface of the wall or housed within the thickness thereof. To connect the distribution cable to the drop cables, a number of optical fibers are pulled out of the distribution cable/duct and are spliced to respective ends of the optical fibers of the drop cables. Each drop cable is then typically terminated in a termination box located in the proximity of or inside an apartment or office of an end user.

Conventional distribution boxes typically offer only one mechanism for splicing the optical fiber of the distribution cable with the optical fiber of the drop cable. Therefore, a need exists for an optical fiber connection box that provides multiple mechanisms for splicing the optical fiber of the distribution cable with the optical fiber of the drop cable. Additionally or alternatively, it may be desirable to provide an optical fiber connection box that provides separate storage sections for housing the distribution cable and the drop cable.

SUMMARY

According to various aspects of the present disclosure, an optical connection box for housing an optical connection between a distribution cable and at least one drop cable of an optical access network includes a base. The base includes a bottom configured to house an excess length of a first optical fiber of a distribution cable in a first section of the interior and configured to house an excess length of a second optical fiber of a drop cable in a second section of the interior, a first sidewall having a slot and recessed configured to receive a duct housing the distribution cable, and a plurality of splice-holder elements extending from the bottom of the base and configured to house at least one splice between the first optical fiber of the distribution cable and either (i) the second optical fiber of the drop cable, or (ii) an optical fiber pigtail that is coupled with the second optical fiber of the drop cable. The first section and the second section are disposed on opposite sides of the splice-holder elements.

The foregoing illustrative summary, as well as other exemplary objectives and/or advantages of the invention, and the manner in which the same are accomplished, are further explained within the following detailed description and its accompanying drawings.

DETAILED DESCRIPTION OF EMBODIMENTS

Figure 1:
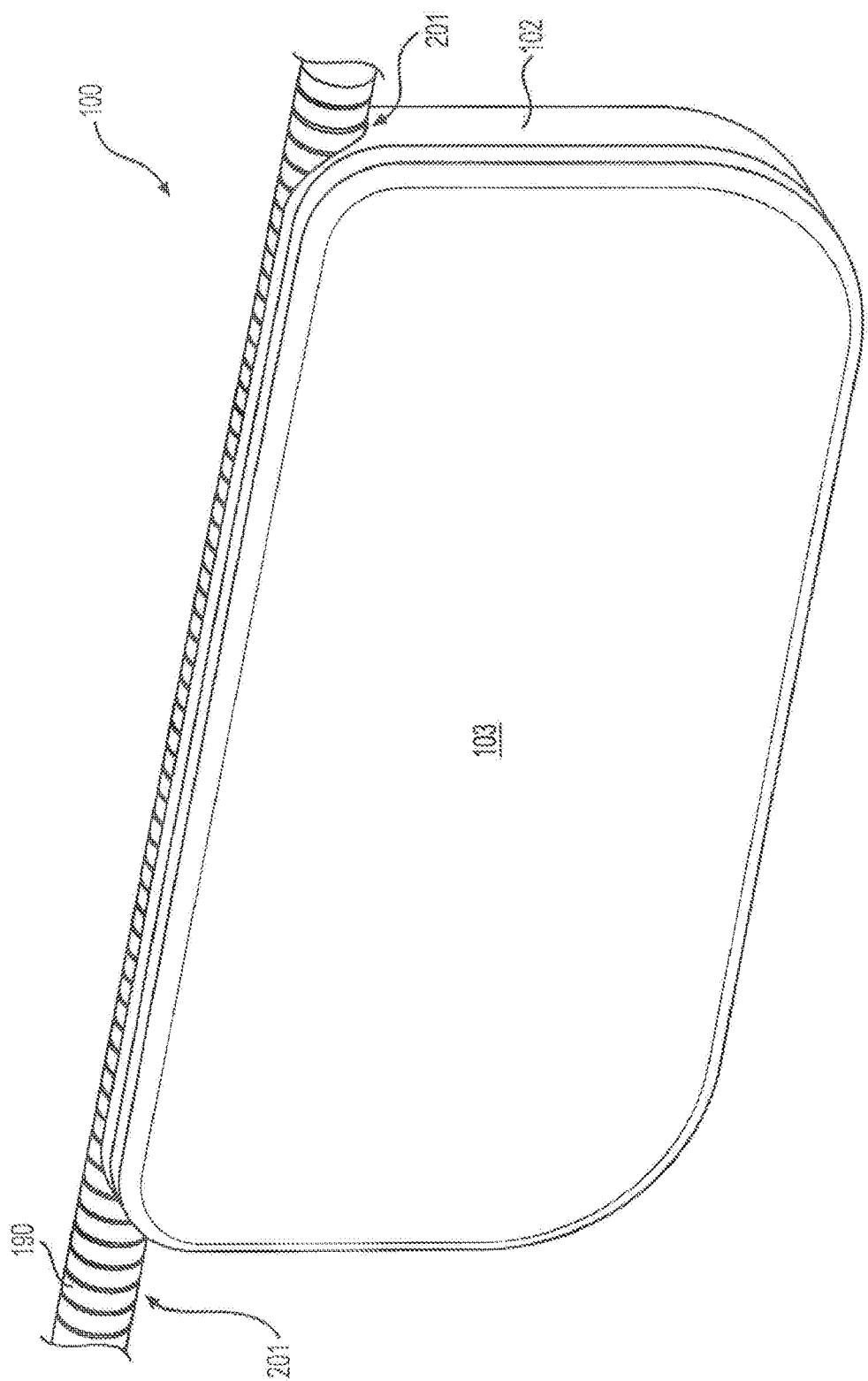
FIG. 1 is a perspective view of an exemplary optical fiber connection box for a multi-dwelling unit in a closed configuration according to various aspects of the present disclosure.
Figure 2:
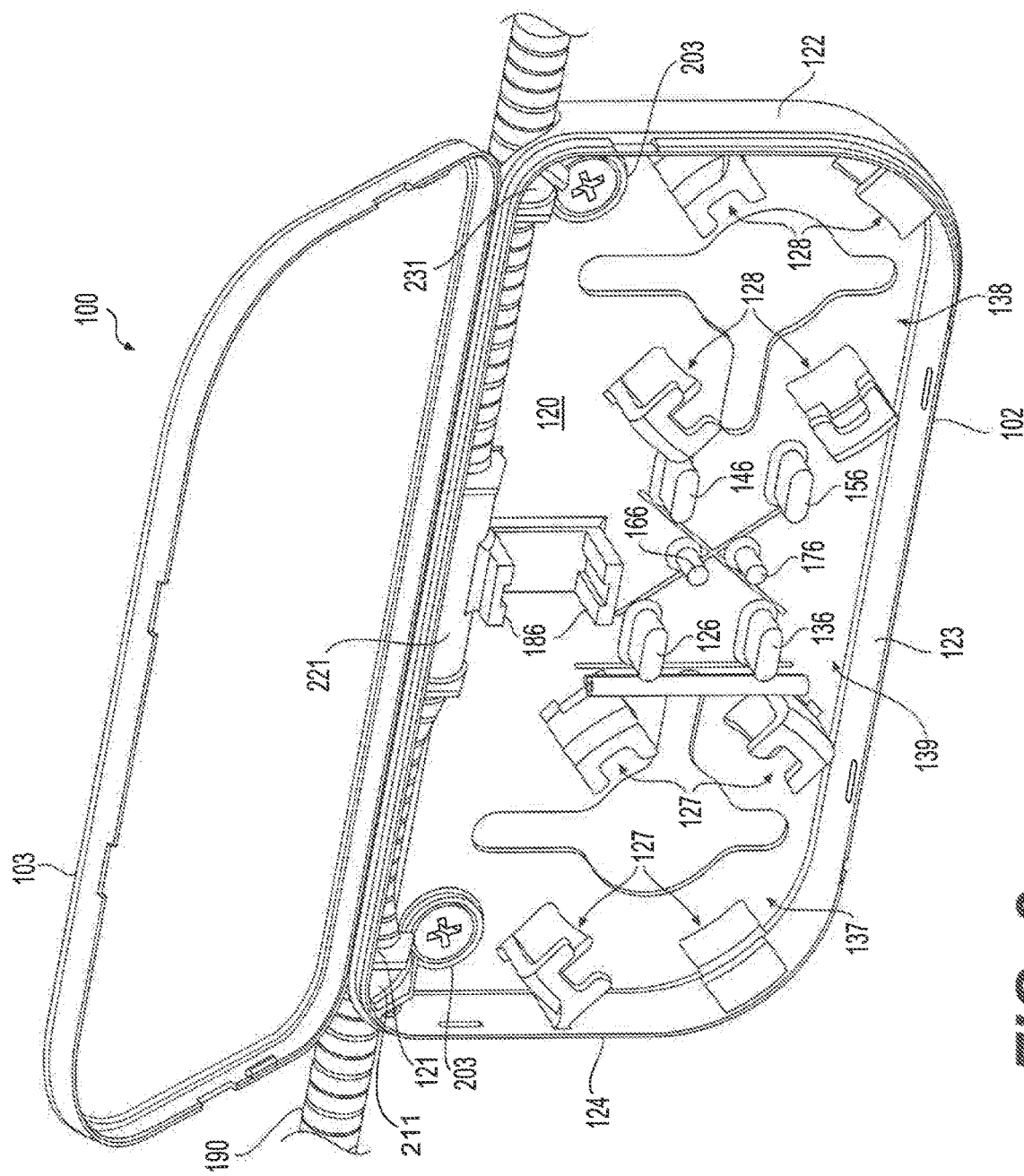
FIG. 2 is a perspective view of the optic fiber connection box of FIG. 1 in an open configuration.

FIGS. 1-6 show an optical fiber connection box 100 (referred to herein as "box") for a multi-dwelling unit according to various aspects of the present disclosure. According to an embodiment, the box 100 includes a base 102 and a cover 103. In some aspects, the cover 103 may be pivotable relative to the base 102 and, in some aspects, the cover 103 may be removably coupled with the base 102, as would be understood by persons of ordinary skill in the art.

With reference to FIGS. 2-6, the base 102 includes a bottom 120 and adjacent sidewalls 121, 122, 123, and 124. The sidewalls 121, 122, 123, and 124 may be substantially perpendicular to the bottom 120 (e.g., perpendicularly abutting). The bottom 120 may be substantially rectangular with rounded-off corners, as illustrated in FIGS. 1-6.

The sidewall 121 includes a slot 201 along its length and one or more recessed portions 211, 221, 231. The recessed portions 211, 221, 231 are substantially aligned with the slot 201. The recessed portions 211, 221, 231 may have a semicircular shape configured to house a portion of a duct 190 that houses a distribution cable 192 that includes one or more optical fiber cables 194. The recessed portions 211, 221, 231 may divide the slot 201 into a plurality of slots and/or one or more of the recessed portions 211, 221, 231 may be spaced apart by a slot 201. The recessed portions 211, 221, 231 may include projections (not shown) on their outer surface (i.e., the surface facing the duct 190) that are configured and arranged to engage with grooves in the duct 190 that houses the distribution cable 192.

As shown in FIGS. 2-6, the bottom 120 of the base 102 also includes one or more bosses 203 configured to receive an appropriate fixing member (e.g., a threaded member such as a screw or a pin) for fixing the base 102 to a structure such as, for example, a wall, a ceiling, a floor, etc., as will be described in greater detail below.

The base 102 includes a plurality of splice-holder elements 126, 136, 146, 156, 166, 176 that project from the bottom 120 into an interior of the base 102. The base 102 also includes a pair of bulkhead holders 186 that face one another and are configured to receive a bulkhead connector, for example, a subscriber connector (SC) bulkhead 354 that is configured to couple two optical fibers that are terminated with SC connectors 352, 359 (see FIG. 3). In other embodiments, the bulkhead holders 186 may be configured to hold a bulkhead connector that is configured to couple other types of connectors, including but not limited to, Lucent Connectors (LC connectors) and the like. The splice-holder elements 126, 136, 146, 156, 166, 176 and the bulkhead holders 186 are disposed at a center region 139 of the base 102 with respect to the direction in which the duct 190 extends.

The base 102 also includes a plurality of first wrap guides 127 and a plurality of second wrap guides 128 that project from the bottom 120 towards the interior of the base 102. The first wrap guides 127 form a first storage region 137 for storing slack cable, and the second wrap guides 128 form a second storage region 138 for storing slack cable. The first and second wrap guides 127, 128 include arms that extend from the bottom 120 and terminate in fingers that are substantially perpendicular to the arms and parallel to the bottom 120. The first and second storage regions 137, 138 are disposed on opposite sides of the center region 139 relative to the direction in which the duct 190 extends.

The first and second wrap guides 127, 128 are arranged to cause a fiber optic cable to follow an arcuate or circular path that is greater than or equal to a minimum bend radius of the fiber optic cable. The bend radii of the arcuate or circular paths in the storage regions 137, 138 of the respective wrap guides 127, 128 are generally greater than the minimum permissible bend radius of the cable to prevent signal losses. For example, as the bend radius of an optic fiber or filament decreases to the minimum permissible bend radius, the incident light energy is not fully reflected internally of the optic filament. Accordingly, light energy is refracted out of the filament causing a portion of the light energy to be absorbed or lost.

Each of the arms of the first wrap guides 127 have inward facing surfaces that face radially inward relative to the arcuate or circular path of the first storage region 137, and each of the arms of the second wrap guides 128 have inward facing surfaces that face radially inward relative to the arcuate or circular path of the second storage region 138. The inward facing surfaces of the first wrap guides 127 define the arcuate or circular path radially inward of the first wrap guides 137, and the inward facing surfaces of the second wrap guides 128 define the arcuate or circular path radially inward of the second wrap guides 138.

In some embodiments, the plurality of splice-holder elements include a pair of central elements 166, 176 that are cylindrical shaped and are disposed between a first pair 126, 136 of the plurality of splice-holder elements that are proximate to the first storage region 137 and a second pair 146, 156 of the plurality of splice-holder elements that are proximate to the second storage region 138. In some embodiments, the first and second pairs 126, 136, 146, 156 of the plurality of splice-holder elements have an oval shape in a plane transverse to the direction in which the plurality of splice-holder elements extend away from the bottom 120.

The base 102 of the connection box 100 can be realized, for example, as a single monolithic body by molding a plastic material. For example, in some aspects, the plastic material used can be ABS (acrylonitrile butadiene styrene). The cover 103 includes a top 130 and four sidewalls 131, 132, 133 and 134. The shape and dimensions of the cover 103 correspond to the shape and dimensions of the base 102, and therefore the cover 103 can be placed on the base 102 to close the box 100. The cover 103 can, for example, be realized using the same material and the same process as for the base 102.

Below, exemplary processes for installing the connection box 100 are described in detail.

A connection box 100 is typically installed on one floor of a multi-dwelling unit building for optically connecting a distribution cable 192 to one or more drop cables, which typically run towards the apartments or offices of end users residing on that floor. The distribution cable 192 typically includes a number of optical fibers 194, which can be arranged in the outer casing of the cable 192 in any known arrangement. For example, the optical fibers can be arranged in strips, modules, and/or micromodules, which in turn are housed in the outer casing. Typically, each optical fiber of the distribution cable is arranged in a respective optical module, which includes one or more optical fibers and a sheath. The distribution cable 192 may be arranged in a duct 190. Each drop cable can include one or more optical fibers. Typically, each drop cable includes a single optical fiber arranged in an optical module, which includes the optical fiber and a sheath.

Below, for reasons of simplicity, the expression "optical fiber" (relating both to the fibers of the distribution cable and to the fibers of the drop cable) indicates an optical fiber with the respective sheath.

As shown in FIGS. 2-5, an operator opens an access window 191 in the duct 190 of the portion of the distribution cable 192 to be housed in the box 100, so as to expose the optical fibers present therein.

Figure 3:
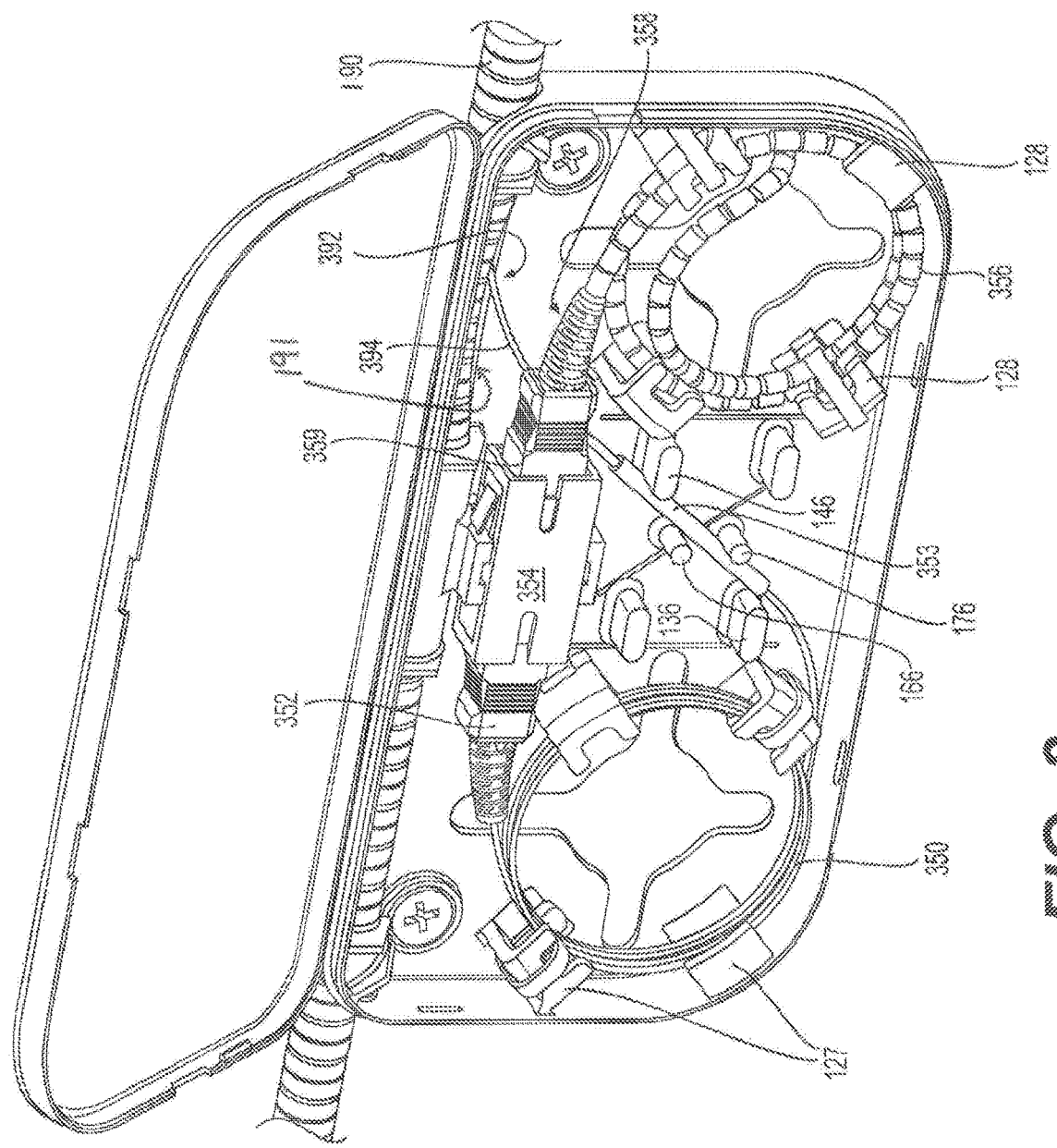
FIG. 3 is a perspective view of the optic fiber connection box of FIG. 2 illustrating a first connection arrangement.

Referring to FIG. 3, in some aspects, a fiber 394 of the distribution cable 392 is cut and brought into the box 100 through the window. An SC bulkhead 354 is positioned between and held by the bulkhead holders 186. An SC pigtail 350 includes a slack portion wrapped in the arcuate or circular path of the first storage region 137 defined by the inward facing surfaces of the first wrap guides 127. In some aspects, the pigtail 350 may be coupled with one or more of the first wrap guides 127 by a coupling member such as, for example, a Velcro band, a twist-tie, or the like. The SC pigtail 350 has a first end with a bare optical fiber and a second end terminated with an SC connector 352. The fiber 394 is fusion spliced to the first end of an SC pigtail 350, and the splice is covered with the shrinkwrap 353, which is held in a desired orientation by a subset of the plurality of the splice-holder elements 136, 146, 166, 176.

For example, in the desired orientation, the subset of the plurality of the splice-holder elements 136, 146, 166, 176 are sized, spaced apart from one another and configured such that the shrinkwrap 353 is held in an interference fit or friction fit relationship by the subset of the plurality of the splice-holder elements 136, 146, 166, 176. As shown in FIG.

3, the shrinkwrap extends between the central elements 166, 176 and is held by surfaces of the elements 136, 146 that face in directions that are opposite to one another.

The SC connector 352 at the second end of the pigtail 350 is coupled with a first port of the SC bulkhead 354. A drop cable 356 has a first end 358 terminated with an SC connector 359 that is coupled with a second port of the SC bulkhead 354 such that the SC connectors 354, 359 are optically coupled to one another. The drop cable 356 runs towards the apartment or office of an end user residing on that floor. The drop cable 356, for example, a Miniflex® cable, may be fed through an opening in the bottom 102 of the box 100 and through a hole in the wall to the apartment or office. An excess length (i.e., slack) of the drop cable 356 is wrapped in the arcuate or circular path of the second storage region 138 defined by the inward facing surfaces of the second wrap guides 128. The arcuate or circular paths are greater than or equal to a minimum bend radius of the fiber optic cable.

Figure 4:
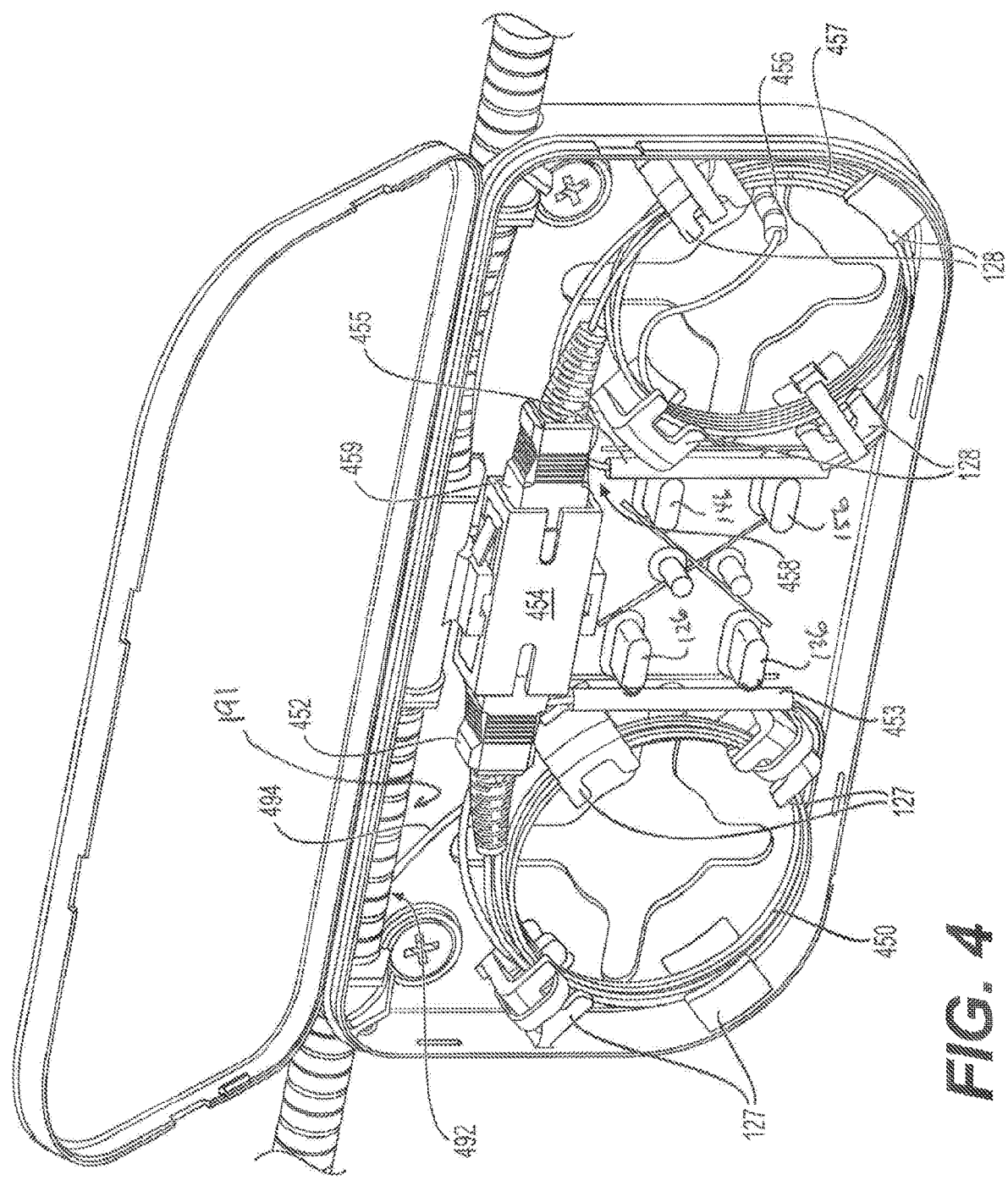
FIG. 4 is a perspective view of the optic fiber connection box of FIG. 2 illustrating a second connection arrangement.

Referring to FIG. 4, in some aspects, a fiber 494 of the distribution cable 492 is cut and brought into the box 100 through the window 191. The fiber 494 is fusion spliced to a first end of an SC pigtail 450, which has a second end terminated with an SC connector 452. The splice is covered with a shrinkwrap 453, which is held in a desired orientation by a subset of the plurality of the splice-holder elements 126, 136 and two of the first wrap guides 127 that are most proximate to the splice-holder elements 126, 136.

For example, in the desired orientation, the subset of the plurality of the splice-holder elements 126, 136 and the two of the first wrap guides 127 that are most proximate to the splice-holder elements 126, 136 are sized, spaced apart from one another and configured such that the shrinkwrap 453 is held in an interference fit or friction fit relationship by the subset of the plurality of the splice-holder elements 126, 136 and the two of the first wrap guides 127 that are most proximate to the splice-holder elements 126, 136. As shown in FIG. 4, the shrinkwrap extends between the central elements 166, 176 and is held by surfaces of the subset of the plurality of the splice-holder elements 126, 136 and the two of the first wrap guides 127 that are most proximate to the splice-holder elements 126, 136 that face one another with respect to the direction in which the duct 190 extends.

The SC connector 452 at the second end of the pigtail 450 is coupled with an SC bulkhead 454. A drop cable 456 has a first end 458 fusion spliced with a first end of a second SC pigtail 451. The second SC pigtail 451 has a second end that is terminated with an SC connector 459. The SC connector 459 is coupled with the SC bulkhead 454 such that the SC connectors 452, 459 are optically coupled to one another. The splice is covered with a shrinkwrap 455, which is held by a plurality of the splice-holder elements 146, 156 and two of the first wrap guides 128 that are most proximate to the splice-holder elements 146, 156. A second end of the drop cable 456 runs towards the apartment or office of an end user residing on that floor. The drop cable 456, for example, a Miniflex® cable, may be fed through an opening in the bottom 102 of the box 100 and through a hole in the wall to the apartment or office. The excess length (i.e., slack) of the SC pigtail 450 is wrapped in the arcuate or circular path of the first storage region 128 defined by the inward facing surfaces of the first wrap guides 127, and the optical fiber 457 of the drop cable 456 is wrapped in the arcuate or circular path of the second storage region 138 defined by the inward facing surfaces of the second wrap guides 137. The arcuate or circular paths are greater than or equal to a minimum bend radius of the fiber optic cable.

Figure 5:
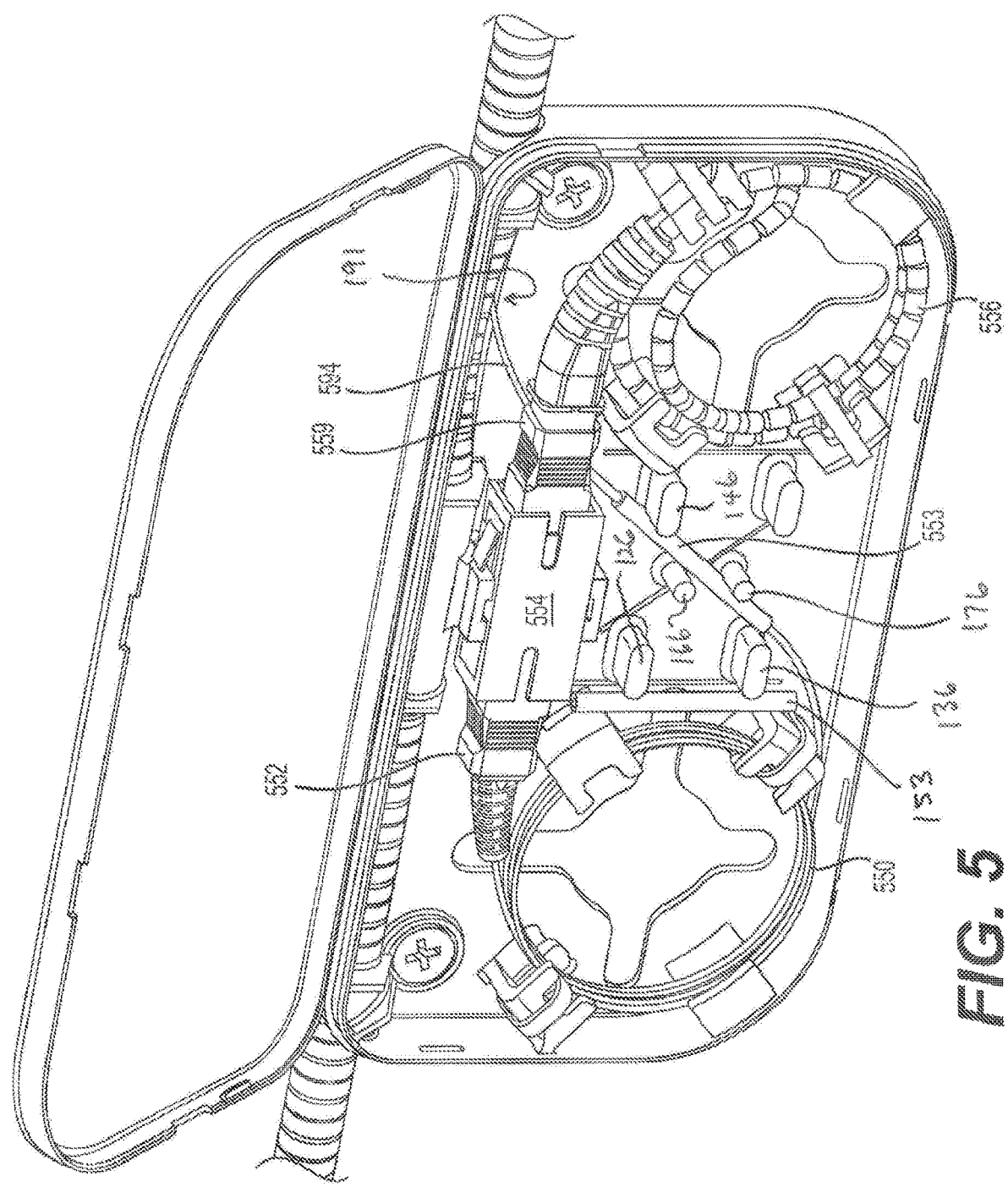
FIG. 5 is a perspective view of the optic fiber connection box of FIG. 2 illustrating a third connection arrangement.

Referring to FIG. 5, in some aspects, a fiber 594 of the distribution cable 592 is cut and brought into the box 100 through the window 191. The fiber 594 is fusion spliced to a first end of an SC pigtail 550, which has a second end terminated with an SC connector 552. The splice is covered with a shrinkwrap 553, which is held in a desired orientation by a subset of the plurality of the splice-holder elements 136, 146, 166, 176.

For example, in the desired orientation, the subset of the plurality of the splice-holder elements 136, 146, 166, 176 are sized, spaced apart from one another and configured such that the shrinkwrap 553 is held in an interference fit or friction fit relationship by the subset of the plurality of the splice-holder elements 136, 146, 166, 176. As shown in FIG. 5, the shrinkwrap extends between the central elements 166, 176 and is held by surfaces of the elements 136, 146 that face in directions that are opposite to one another. A spare shrinkwrap 153 may be held in a manner similar to the way in which he shrinkwrap 453 is held in FIG. 4.

The SC connector 552 at the second end of the pigtail 550 is coupled with an SC bulkhead 554. A drop cable 556 that has a first end terminated with an SC Balistix® connector 559 that is connected with the SC bulkhead 554 such that the SC connectors 552, 559 are optically coupled to one another. A second end of the drop cable 556 runs towards the apartment or office of an end user residing on that floor. The drop cable 556, for example, a Miniflex® cable, may be fed through an opening in the bottom 102 of the box 100 and through a hole in the wall to the apartment or office. The excess length (i.e., slack) of the SC pigtail 550 is wrapped in the arcuate or circular path of the first storage region 128 defined by the inward facing surfaces of the first wrap guides 127, and the drop cable 556 is wrapped in the arcuate or circular path of the second storage region 138 defined by the inward facing surfaces of the second wrap guides 137. The arcuate or circular paths are greater than or equal to a minimum bend radius of the fiber optic cable.

Figure 6:
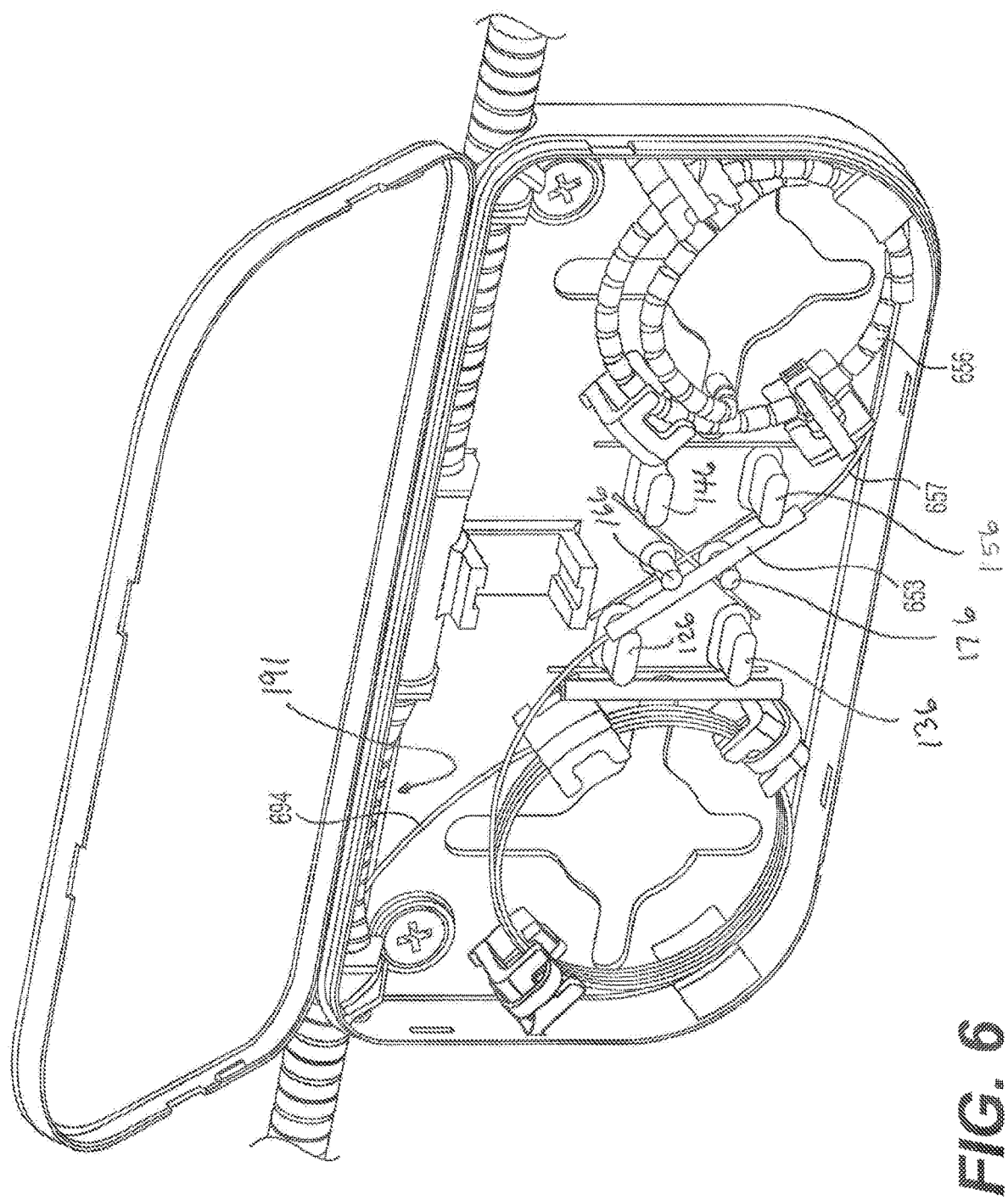
FIG. 6 is a perspective view of the optic fiber connection box of FIG. 2 illustrating a fourth connection arrangement.

Referring to FIG. 6, in some aspects, a fiber 694 of the distribution cable 692 is cut and brought into the box 100 through the window 191. An end of the fiber 694 is fusion spliced to a first end of a drop cable 656, for example, a Miniflex® cable. The splice is covered with shrinkwrap 653, which is held in a desired orientation by a subset of the plurality of the splice-holder elements 126, 156, 166, 176.

For example, in the desired orientation, the subset of the plurality of the splice-holder elements 126, 156, 166, 176 are sized, spaced apart from one another and configured such that the shrinkwrap 553 is held in an interference fit or friction fit relationship by the subset of the plurality of the splice-holder elements 126, 156, 166, 176. As shown in FIG. 6, the shrinkwrap extends between the central elements 166, 176 and is held by surfaces of the elements 136, 146 that face in directions that are opposite to one another. A spare shrinkwrap 153 may be held in a manner similar to the way in which he shrinkwrap 453 is held in FIG. 4.

A second end of the drop cable 656 may be fed through an opening in the bottom 102 of the box 100 and through a hole in the wall to the apartment or office. The excess length (i.e., slack) of the fiber 694 of the distribution cable 692 is wrapped in the arcuate or circular path of the first storage region 128 defined by the inward facing surfaces of the first wrap guides 127, and the optical fiber 357 of the drop cable 356 is wrapped in the arcuate or circular path of the second storage region 138 defined by the inward facing surfaces of the second wrap guides 137. The arcuate or circular paths are greater than or equal to a minimum bend radius of the fiber optic cable.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

It is also easy to install this box, because it can be placed on the exposed portion of the distribution cable without the bottom of the base of the box having to pass behind the cable.

The invention claimed is:

1. An enclosure box assembly for fiber optic cable that is configured to prevent removal of the enclosure from a support, comprising:
   an enclosure portion including a front wall, a back wall, a top wall, a bottom wall, and two opposed side walls that define an interior, wherein the enclosure portion comprises an enclosure box and a preterminated fiber optic drop cable;
   a mounting portion including a top edge, a bottom edge, and two opposed side edges and configured to be mounted to a support without accessing the interior of the enclosure portion, wherein the mounting portion comprises a backplate;
   wherein the enclosure portion is configured to house and prevent access to a portion of a fiber optic adapter in the interior and a portion of a fiber optic cable that is configured to be optically coupled with the portion of the fiber optic adapter in the interior;
   wherein the mounting portion includes an enclosure portion latching portion extending from the front surface of the planar member inward of the top edge, the bottom edge, and the two opposed side edges into the interior of the enclosure box;
   wherein the enclosure portion includes a mounting portion latching portion configured to latch with the enclosure portion latching portion so as to couple the enclosure portion with the mounting portion and prevent the mounting portion from being unmounted from a support; and
   wherein the enclosure portion is configured to prevent access to the inward location of the enclosure portion latching portion so as to prevent a latched configuration of the enclosure portion latching portion with the mounting portion latching portion from being unlatched, thereby preventing the enclosure portion from being uncoupled from the mounting portion.

2. The enclosure of claim 1, wherein the enclosure portion is configured to be coupled with the mounting portion without twisting or turning the enclosure portion relative to the mounting portion.

3. The enclosure of claim 1, wherein the front wall, the back wall, the top wall, the bottom wall, and the two opposed side walls are a monolithic structure of unitary construction such that the front wall is not removable from the bottom wall, the top wall, the two side walls, and the back wall.

4. The enclosure of claim 1, wherein the latched configuration of the enclosure portion with the mounting portion is configured to permit a portion of the fiber optic cable to pass between the enclosure portion and the mounting portion.

5. The enclosure of claim 1, wherein the enclosure portion latching portion comprises a plurality of latches.

6. The enclosure of claim 1, wherein the enclosure portion is configured to be fixedly coupled with the mounting portion after the mounting portion is attached to a support and without accessing an interior of the enclosure portion.

7. An enclosure installation kit comprising:
   a box containing a reel and the enclosure of claim 1;
   a tray containing the enclosure portion and the mounting portion; and
   wherein a fiber optic cable is wound on the reel.

8. An enclosure configured to prevent removal of the enclosure from a support, comprising:
   an enclosure portion configured to have an interior;
   a mounting portion structurally configured to be coupled with the enclosure portion;
   wherein the enclosure portion is configured house and prevent access to a portion of a fiber optic adapter in the interior and a portion of a fiber optic cable that is configured to be optically coupled with the portion of the fiber optic adapter in the interior;
   wherein the mounting portion includes an enclosure portion latching portion that is configured to extend into the interior of the enclosure portion and to couple with a mounting portion latching portion of the enclosure portion so as to couple the enclosure portion with the mounting portion; and
   wherein the enclosure portion is configured to prevent access to the enclosure portion latching portion so as to prevent a latched configuration of the enclosure portion latching portion with the mounting portion latching portion from being unlatched, thereby preventing the enclosure portion from being uncoupled from the mounting portion.

9. The enclosure of claim 8, wherein the enclosure portion is configured to be coupled with the mounting portion without twisting or turning the enclosure portion relative to the mounting portion.

10. The enclosure of claim 8, wherein the enclosure portion includes a front wall, a back wall, a top wall, a bottom wall, and two opposed side walls that are a monolithic structure of unitary construction such that the front wall is not removable from the bottom wall, the top wall, the two side walls, and the back wall.

11. The enclosure of claim 8, wherein the latched configuration of the enclosure portion with the mounting portion is configured to permit a portion of the fiber optic cable to pass between the enclosure portion and the mounting portion.

12. The enclosure of claim 8, wherein the mounting portion comprises a planar member having a top edge, a bottom edge, and two opposed side edges; and wherein the enclosure portion latching portion comprises a plurality of latches that are configured to extend from a front surface of the planar member inward of the top edge, the bottom edge, and the two opposed side edges into the interior of the enclosure portion.

13. The enclosure of claim 12, wherein the inward location of the latches prevents the latches from being accessible when the latches are interlocked with the mounting portion latching portion.

14. The enclosure of claim 8, wherein the latched configuration of the enclosure portion latching portion with the mounting portion latching portion is configured to couple the enclosure portion with the mounting portion so as to prevent the mounting portion from being unmounted from a support.

15. The enclosure of claim 8, wherein the enclosure portion is configured to be fixedly coupled with the mounting portion after the mounting portion is attached to a support and without accessing an interior of the enclosure portion.

16. An enclosure installation kit comprising:
a box containing a reel and the enclosure of claim 8;
a tray containing the enclosure portion and the mounting portion; and
wherein a fiber optic cable is wound on the reel.

17. An enclosure configured to prevent removal of the enclosure from a support, comprising:
an enclosure portion structurally configured to prevent access to a portion of a fiber optic adapter in the enclosure portion and a portion of a fiber optic cable that is configured to be optically coupled with the portion of the fiber optic adapter in the enclosure portion;
a mounting portion configured to extend into the enclosure portion and to latch with the enclosure portion so as to secure the enclosure portion with the mounting portion; and
wherein the enclosure portion is configured to prevent a latched configuration of the enclosure portion with the mounting from being unlatched, thereby preventing the enclosure portion from being uncoupled from the mounting portion.

18. The enclosure of claim 17, wherein the enclosure portion is configured to be fixedly coupled with the mounting portion after the mounting portion is attached to a support and without accessing an interior of the enclosure portion.

19. The enclosure of claim 17, wherein the enclosure portion is configured to be coupled with the mounting portion without twisting or turning the enclosure portion relative to the mounting portion.

20. The enclosure of claim 17, wherein the enclosure portion includes a front wall, a back wall, a top wall, a bottom wall, and two opposed side walls that are a monolithic structure of unitary construction such that the front wall is not removable from the bottom wall, the top wall, the two side walls, and the back wall.

21. The enclosure of claim 17, wherein the latched configuration of the enclosure portion with the mounting portion is configured to permit a portion of the fiber optic cable to pass between the enclosure portion and the mounting portion.

22. The enclosure of claim 17, wherein the mounting portion comprises a planar member having a top edge, a bottom edge, and two opposed side edges; and wherein the mounting portion includes an enclosure portion latching portion that is configured to extend into the interior of the enclosure portion and to couple with a mounting portion latching portion of the enclosure portion so as to couple the enclosure portion with the mounting portion.

23. The enclosure of claim 22, wherein the enclosure portion latching portion comprises a plurality of latches that are configured to extend from a front surface of the planar member inward of the top edge, the bottom edge, and the two opposed side edges into the interior of the enclosure portion.

24. The enclosure of claim 23, wherein the inward location of the latches prevents the latches from being accessible when the latches are interlocked with the mounting portion latching portion.

25. The enclosure of claim 17, wherein the latched configuration of the enclosure portion latching portion with the mounting portion latching portion is configured to couple the enclosure portion with the mounting portion so as to prevent the mounting portion from being unmounted from a support.

26. An enclosure installation kit comprising:
a box containing a reel and the enclosure of claim 17;
a tray containing the enclosure portion and the mounting portion; and
wherein a fiber optic cable is wound on the reel.

* * * * *